United States Patent
Freund et al.

(10) Patent No.: US 9,365,193 B2
(45) Date of Patent: Jun. 14, 2016

(54) FIXED CALIPER BRAKE AND BRAKE PAD FOR A FIXED CALIPER BRAKE

(75) Inventors: Verena Freund, Bruchköbel (DE); Dieter Kristen, Dreieich (DE); Klaus-Dieter Paschke, Hofheim (DE); Joachim Rehm, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 21 days.

(21) Appl. No.: 13/700,481
(22) PCT Filed: May 25, 2011
(86) PCT No.: PCT/EP2011/058543
§ 371 (c)(1), (2), (4) Date: Nov. 28, 2012
(87) PCT Pub. No.: WO2011/151235
PCT Pub. Date: Dec. 8, 2011

(65) Prior Publication Data
US 2013/0068573 A1 Mar. 21, 2013

(30) Foreign Application Priority Data

Jun. 2, 2010 (DE) .......................... 10 2010 029 679
Nov. 15, 2010 (DE) .......................... 10 2010 043 898

(51) Int. Cl.
*B60T 1/06* (2006.01)
*F16D 65/092* (2006.01)
(Continued)

(52) U.S. Cl.
CPC ................ *B60T 1/065* (2013.01); *F16D 55/228* (2013.01); *F16D 65/092* (2013.01); *F16D 65/0977* (2013.01); *F16D 65/0979* (2013.01)

(58) Field of Classification Search
CPC ..... F16D 66/02; F16D 66/021; F16D 66/027; F16D 65/092; F16D 65/097; F16D 65/0977
USPC ...... 188/1.11 R, 1.11 W, 1.11 L, 1.11 E, 369, 188/370, 72.4, 73.1, 73.2, 73.31, 73.37, 188/73.38, 250 R, 251 R, 250 F, 250 B
See application file for complete search history.

(56) References Cited

U.S. PATENT DOCUMENTS 4,498,564 A   2/1985  Tamura
4,677,420 A * 6/1987  Topic et al. ................... 340/454
(Continued)

FOREIGN PATENT DOCUMENTS

DE   38 33 734 A1   5/1989
DE   41 10 850 A1   10/1992
(Continued)

OTHER PUBLICATIONS

International Search Report for PCT/EP2011/058543 mailed Nov. 11, 2011.
German Search Report for German Application 10 2010 043 898.7 mailed Nov. 14, 2011.

*Primary Examiner* — Vishal Sahni
(74) *Attorney, Agent, or Firm* — RatnerPrestia

(57) ABSTRACT

A fixed caliper brake for a motor vehicle, including a housing with two housing limbs and a housing bridge connecting the housing limbs in a flexurally rigid manner at a defined distance from one another, pistons, which are received in bores in the housing limbs and are guided displaceably along an axis A in relation to the brake disk, and brake pads which are provided in pairs, are guided in an axially displaceable manner in the housing and arranged in the circumferential direction while being supported against circumferential forces, each brake pad being actuable directly by at least one piston. The brake pads are supported in a form-fitting manner on the housing bridge at least on the run-in side. At least each arm on the run-in side is configured with a hook shape open on the radially outer side and serves at least partially for form-fitting abutment against the housing.

23 Claims, 15 Drawing Sheets

(51) Int. Cl.
*F16D 55/228* (2006.01)
*F16D 65/097* (2006.01)

(56) References Cited

U.S. PATENT DOCUMENTS

| | | | | |
|---|---|---|---|---|
| 5,284,228 | A * | 2/1994 | Weiler et al. | 188/71.8 |
| 5,297,659 | A | 3/1994 | Thiel et al. | |
| 5,538,105 | A * | 7/1996 | Rike | F16D 55/228 |
| | | | | 188/73.31 |
| 6,170,618 | B1 * | 1/2001 | Rueckert | 188/73.37 |
| 6,983,782 | B2 | 1/2006 | Ravat | |
| 7,275,624 | B2 * | 10/2007 | Gogo | 188/72.1 |
| 7,331,430 | B2 * | 2/2008 | Valvano et al. | 188/71.5 |
| 8,261,889 | B2 * | 9/2012 | Itsuaki | F16D 55/228 |
| | | | | 188/352 |
| 8,544,618 | B2 * | 10/2013 | Klimt et al. | 188/250 F |
| 2004/0154885 | A1 * | 8/2004 | Gotti et al. | 188/250 B |
| 2006/0283673 | A1 * | 12/2006 | Lamport | 188/251 R |
| 2008/0110703 | A1 * | 5/2008 | Reuter et al. | 188/72.4 |
| 2008/0156595 | A1 * | 7/2008 | Matsuzaki | F16D 65/092 |
| | | | | 188/73.37 |
| 2009/0236187 | A1 * | 9/2009 | Bach | F16D 55/226 |
| | | | | 188/72.5 |
| 2010/0219030 | A1 * | 9/2010 | Klimt et al. | 188/250 F |

FOREIGN PATENT DOCUMENTS

| | | |
|---|---|---|
| DE | 41 33 486 A1 | 4/1993 |
| DE | 298 24 937 U1 | 6/2003 |
| DE | 10 2006 052 178 A1 | 6/2007 |
| FR | 2 622 260 | 4/1989 |
| FR | 2622266 | 4/1989 |
| GB | 2 231 928 A | 11/1990 |
| JP | 2005508765 | 4/2005 |
| JP | 2006-322571 | 11/2006 |
| WO | WO 92/17713 | 10/1992 |
| WO | WO 94/24454 | 10/1994 |
| WO | WO 2005/064194 A1 | 7/2005 |
| WO | WO 2007/094017 A1 | 8/2007 |

* cited by examiner

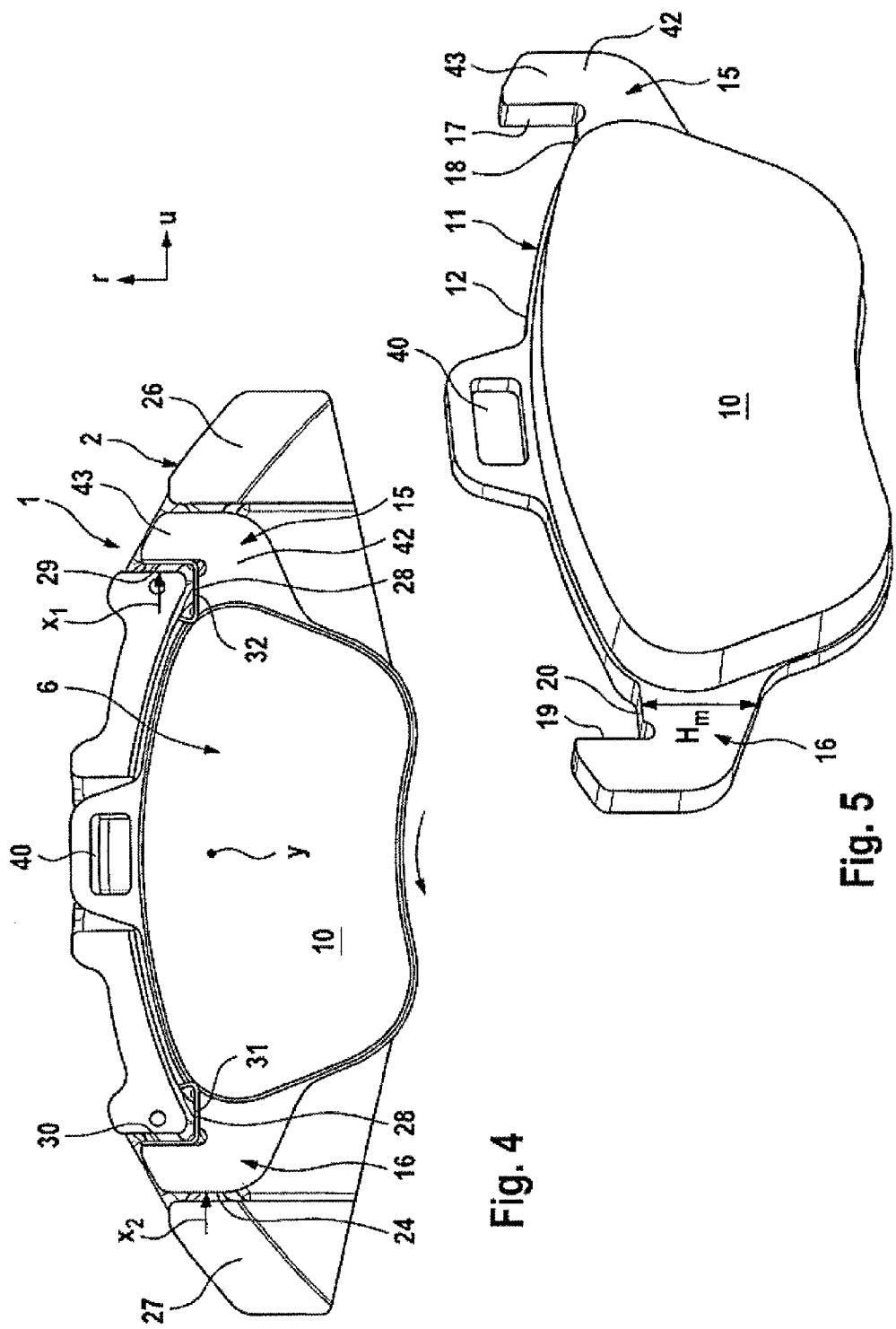

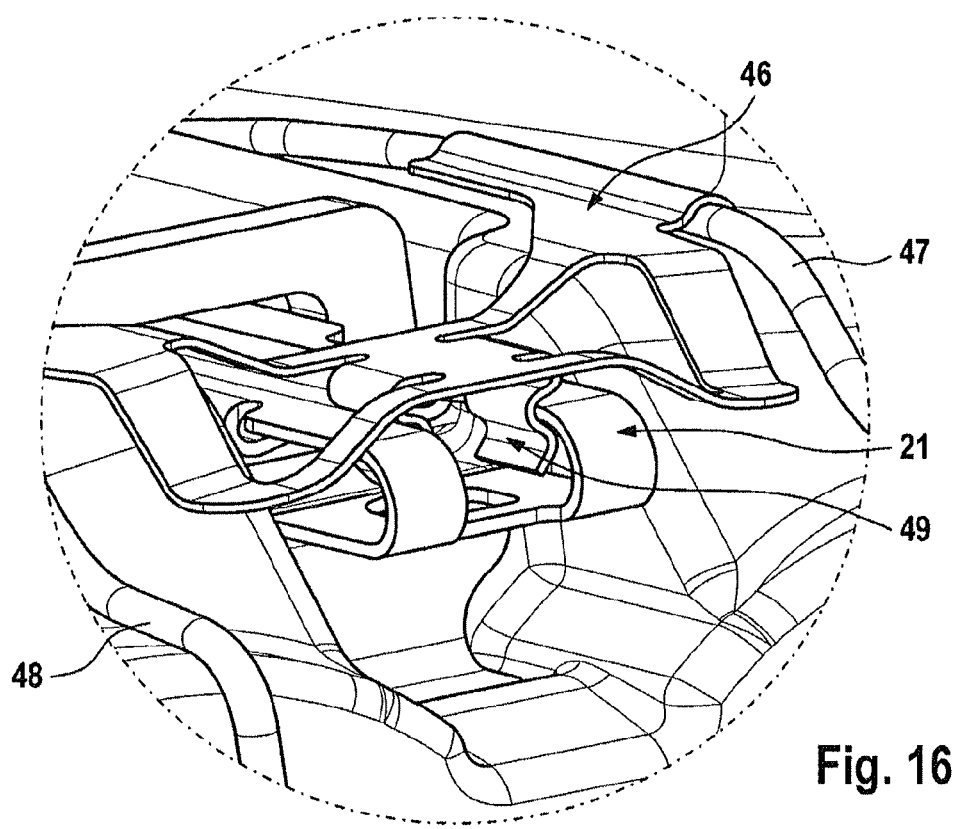
Fig. 16
Fig. 17
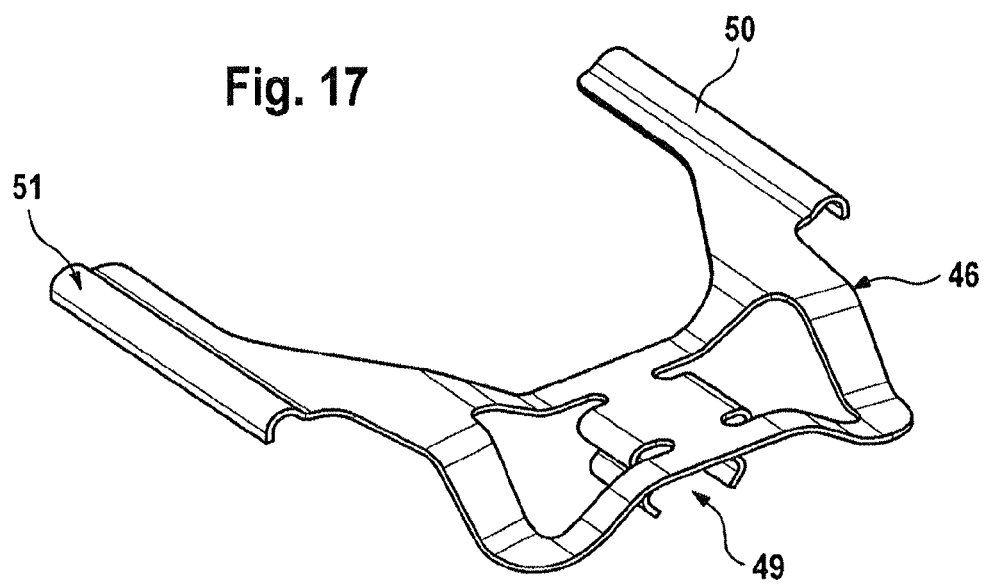

US 9,365,193 B2

FIXED CALIPER BRAKE AND BRAKE PAD FOR A FIXED CALIPER BRAKE

CROSS REFERENCE TO RELATED APPLICATIONS

This application is the U.S. National Phase Application of PCT/EP2011/058543, filed May 25, 2011, which claims priority to German Patent Application Nos. 10 2010 029 679.1, filed Jun. 2, 2010 and 10 2010 043 898.7, filed Nov. 15, 2010, the contents of such applications being incorporated by reference herein.

FIELD OF THE INVENTION

The invention relates to a fixed caliper brake for a motor vehicle, and to a brake pad for a fixed caliper brake, each having the features of the preamble of the respective independent claims.

BACKGROUND OF THE INVENTION

Fixed caliper brakes usually comprise a pincer-shaped housing with two housing limbs and a housing bridge for the flexurally rigid connection of the housing limbs at a defined distance from one another. In the case of partial-lining disk brakes, a segment of a rotor, in other words a segment of a brake disk, together with the brake pads which impinge on the segment, are always accommodated in an intervening space (distance a) between the housing limbs. Pistons, in most cases hydraulically or electromechanically driven, are received in piston bores in the housing limbs and are guided therein in an axially displaceable manner in relation to the brake disk. In addition, the housing limbs and housing bridge define a shaft, open on the radially outer side, to facilitate the replacement of brake pads. In order to absorb circumferential forces, the shaft has abutment faces for contact with the brake pad under pressure in the run-out region of the brake disk. If the fixed caliper is fastened to a stub axle of the motor vehicle it is possible to generate a braking effect by displacing the pistons, preferably hydraulically or electromechanically, with a defined perpendicular force in the direction of the friction surfaces of the brake disk, so that frictional or circumferential forces generated are transmitted via the brake pads to the housing. To secure the brake pads radially, pins passing through bores in the brake pads and mounted in bores in the housing are generally used. It is thereby avoided that the brake pads can be removed unintentionally from the shaft. To avoid rattling noises, a spring with spring arms urging the brake pads permanently and elastically against a stop with an elastic preloading force may be provided.

SUMMARY OF THE INVENTION

An aspect of the invention proposes a fixed caliper brake, or a brake pad for use in a fixed caliper brake, which better meets the currently existing demands regarding, especially, increased strength, reduced residual braking torque, maximized brake lining area, reduced weight, reduced cost and improved appearance. To solve this problem, a fixed caliper brake, or a brake pad, having the characterizing features of the respective independent claims is proposed. Specifically, a fixed caliper brake is proposed wherein the brake pads bear against the housing bridge in a form-fitting manner at least on the run-in side. A further aspect of the invention relates to a brake pad having a brake lining and a back plate for the brake lining, the back plate of the brake pad being configured at least on the run-in side with an arm including a hook shape which is open on the radially outer side, and the back plate serving at least partially to receive a housing portion in a form-fitting manner. The radially outwardly oriented, open configuration of the arms, together with a primarily tractive loading of the back plate and a force application against the housing bridge, further make possible an improved configuration regarding noise behavior (NVH) and protection against corrosion and contamination. Further details of the invention are apparent from the dependent claims in conjunction with the description with reference to the drawing, in which:

BRIEF DESCRIPTION OF THE FIGURES

The invention is best understood from the following detailed description when read in connection with the accompanying drawings. Included in the drawings are the following figures:

FIG. 4 is a sectional view showing a brake pad comprising an opening and abutments in the brake caliper housing;
FIG. 5 is perspective friction mass view of the brake pad shown in FIG. 4;
FIG. 16 is a perspective view showing details of an extra top spring retaining element;
and
FIG. 17 is a perspective view of the extra retaining element in FIG. 16.

DETAILED DESCRIPTION OF THE INVENTION

Figure 1:
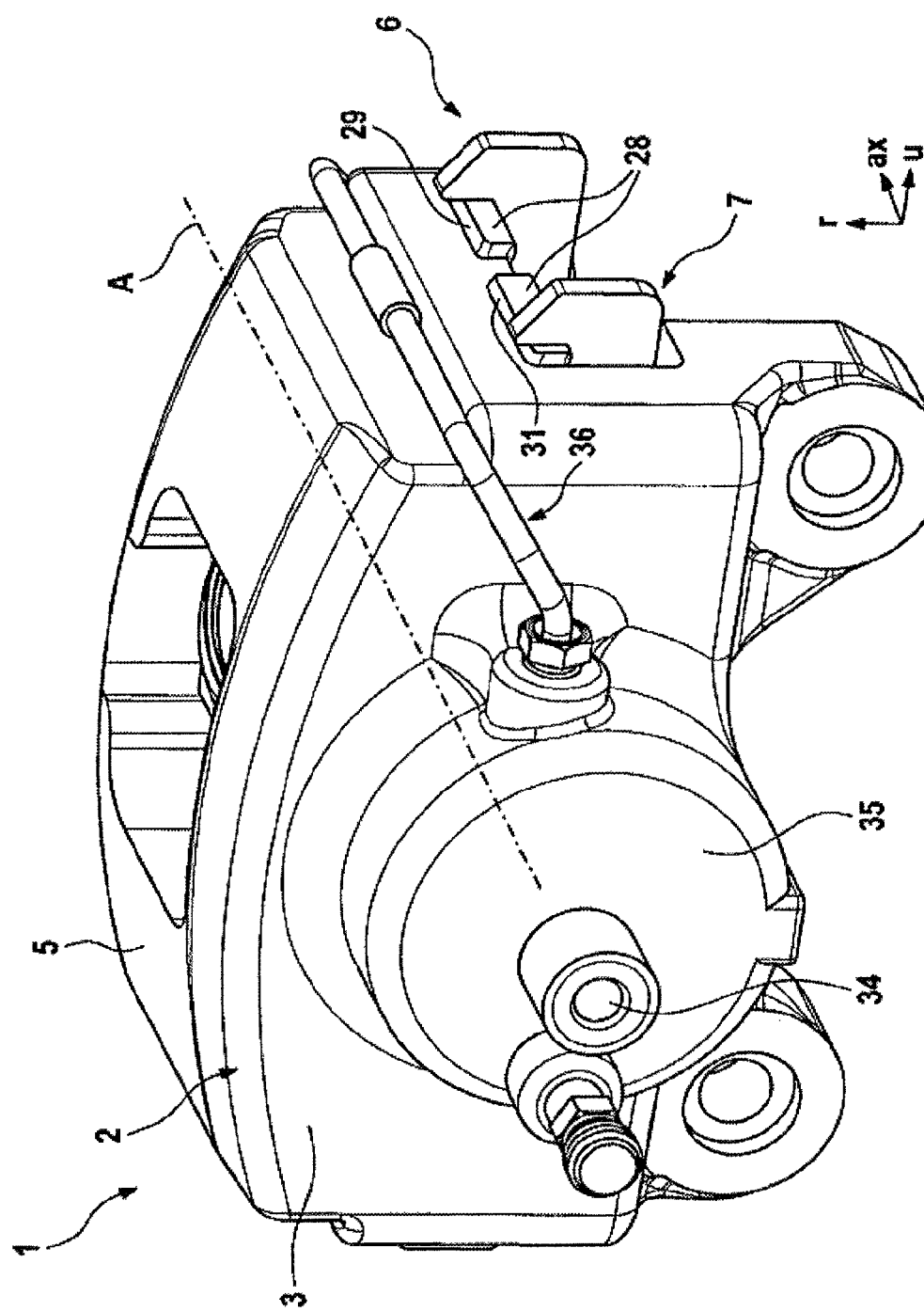
FIG. 1 shows a fixed caliper brake in perspective view.
Figure 2:
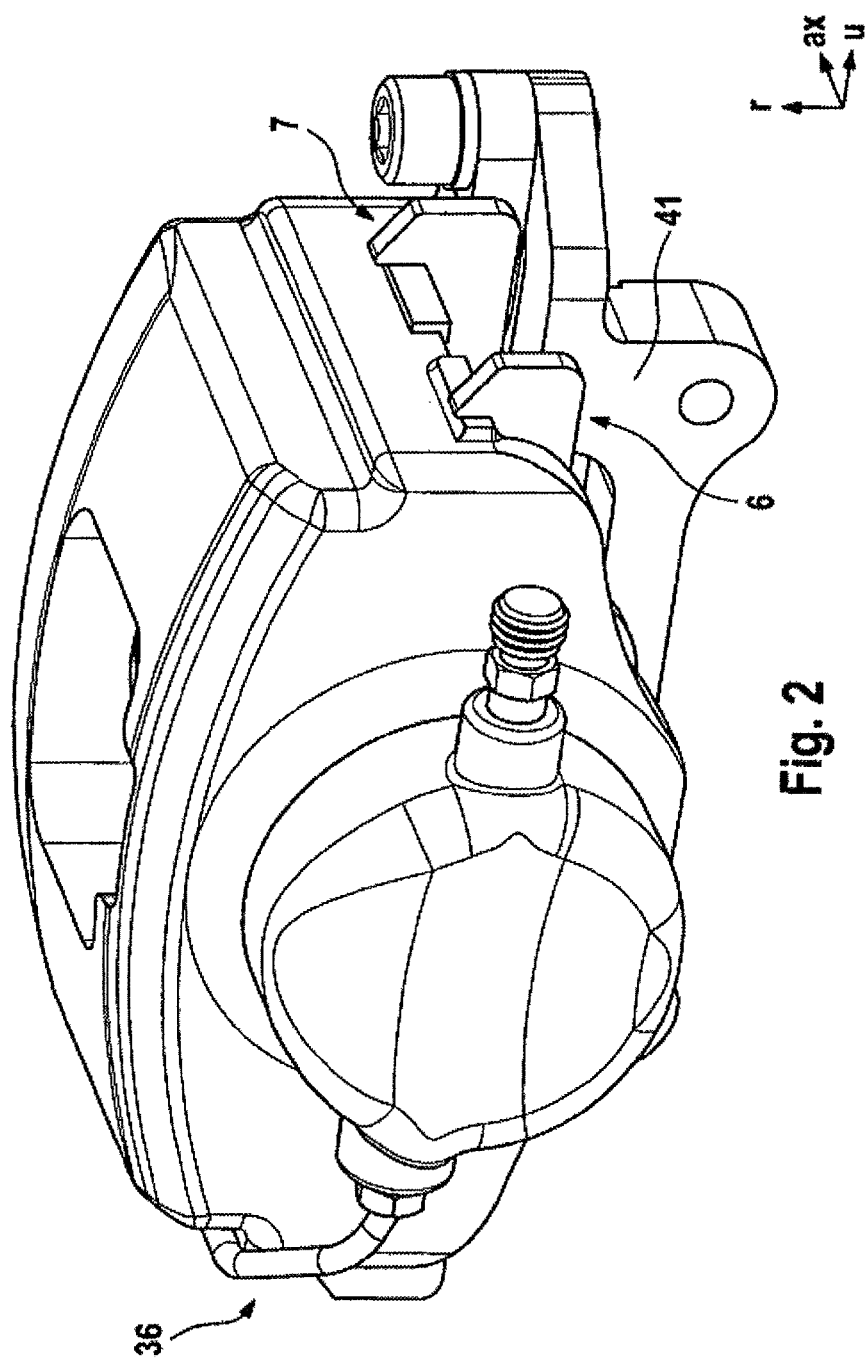
FIG. 2 shows a fixed caliper brake as shown in FIG. 1 mounted on an extra attachment part.

A fixed caliper brake 1 for a motor vehicle can be fastened detachably to a stub axle of a motor vehicle and comprises an integrally formed housing 2 (monobloc housing) having two plateau-shaped housing limbs 3, 4 positioned substantially laterally and having, substantially, a completely closed configuration at least on a wheel side, and a housing bridge 5 which connects the housing limbs 3, 4 in a flexurally rigid manner at a defined distance a from one another. A closed, flat contour of the housing limbs 3, 4 imparts a special, aesthetically closed and harmonious appearance which is also suitable, in particular, for applying design elements such as, in particular, manufacturer emblems in a publicly effective manner. The substantially completely closed housing bridge 5 ensures high bending stiffness and harmonizes with a closed overall appearance of the housing limbs 3, 4. Technical effect (strength) and aesthetics form an optimized symbiosis, the manufacturing process being explained in detail below. The largely closed configuration of the housing bridge 5—without an opening for removing brake pads 6, 7—extends over the brake pads 6, 7 and a brake disk (not shown) in a radially outer region. Pistons 13, 14 are received in an axially displaceable manner along the axis A in bores 8, 9 in the housing limbs 3, 4. In addition, the brake pads 6, 7 are guided in the housing 2 in an axially displaceable manner. Circumferential forces are absorbed on the housing 2 in a circumferential direction. Each brake pad 6, 7 includes a friction compound 10 which is fastened substantially centrally on a central section 12 of a back plate 11. Each brake pad 6, 7 is actuable directly by at least one of the pistons 13, 14. The back plate 11 has arms 15, 16 disposed substantially opposite one another, extending laterally from the central section 12 in each case and oriented in a circumferential direction, which arms 15, 16 each consist of arm sections 42, 43 which are used for tractive absorption of circumferential forces against the housing 2.

To make possible this tractive (so-called "pull") support of the brake pads 6, 7, it is provided that each back plate 11 bears on the run-in side, in a form-fitting manner and in a radially outer region, against a flat machined, defined abutment face 17, 18 of the housing bridge 5, which acts as a bracing element for force transmission. It is further defined that each back plate 11 of a brake pad 6, 7 has on the run-in side at least one hook-shaped, radially outwardly oriented arm 15, 16 which extends with arm section 42 first in the circumferential direction u and then is aligned with arm section 43 radially outwardly parallel to the abutment face 17, 18 of the housing bridge 5, in order to receive radially a section of the housing bridge 5 on the radially outer side. An abutment protected from contamination and corrosion (with respect to flung dirt) for the pull-supported brake pad 6, 7 is thereby formed. Each arm 15, 16 may, in particular, have a hammer-head configuration, one hammer-head point facing radially outwards. Ideally, an ideal point of application X for transmitting force to the housing 2 aligns with an area centroid Y of the friction compound 10 in such a way that the brake pad 6, 7 has in principle no tendency to rotate, since no couple of forces is formed, so that consequently no parasitic turning effect is generated. In other words, through the geometric placement and dimensions of the back plate 11, and through the geometric shaping of the friction compound 10 in relation to the ideally assumed transmission of force to the housing bridge 5, a minimization of rotary tendencies is made possible. If, on the basis of the geometrical arrangement, an imaginary point of application X of the frictional forces is arranged at a radial distance from the area centroid Y, a couple of forces is to an extent defined, so that the run-out end of the brake pad 6, 7 tends to move radially outwards, forming an additional abutment against the housing bridge 5. For this case, abutment faces 19, 20 on the arm 15, 16 arranged parallel to the circumferential direction u come into effect. The additional arms formed in each case on the run-out side of the back plate 11 serve to form a defined, additional abutment of the brake pads 6, 7 on the run-out side, or to support the brake pads 6, 7 independently of the direction of travel. All the arms 15, 16 have, in addition to an extent in the circumferential direction u, an abutment face 17, 18 oriented at least radially outwards.

In order to avoid rattling noises, at least one spring element 21 which is arranged firmly on the housing and permanently loads the two brake pads 6, 7 elastically with at least one spring arm 22, 23 is provided, so that said brake pads 6, 7 can be pressed radially outwards for abutment in their receptacle in the housing 2. Details and alternatives are explained in the text below.

The afore-described embodiment of a fixed caliper brake 1 is intended, in particular, for light passenger cars, for motor vehicles additionally having regenerative braking, or for use in the region of a rear axle, since these applications primarily require comparatively small braking torques and circumferential forces or limited conversion of energy, or if absorption of circumferential forces on only one side (the run-in side) is sufficient for other reasons.

An alternative embodiment of the fixed caliper brake 1 makes possible increased energy conversion and increased braking torques, or reduced surface pressure at points of application, in that the flow of force is split, so that additional points of application X1, X2 can be utilized. Forces are thereby transmitted not only at an end on the run-in side—with the back plate 11 subjected, to an extent, only to a pull force—but push support of the back plate 11 for especially high braking torques is, to an extent, additionally made possible. In this case each back plate 11 may have a quasi-elastic configuration and have an additional abutment face 24, 25 on the respective arm on the run-out side, in such a way that, at least for high loadings, an additional point of application X2 is provided to transmit frictional forces (circumferential forces) to a frame-like extension 26, 27 of the housing bridge 5. The flow of force is thereby, to an extent, split, a first force component being transmissible at the point of application X1 on the run-in side to a stop face 29, and an additional force component, especially in the case of high circumferential forces, being transmissible at application point X2 on the run-out side to a stop face 30. Depending on the dimension of a tolerance between abutment faces 17, 18; 24, 25 on the back plate 11 and the associated stop faces 29, 30 on the housing 2, the support can be arranged variably by degrees (pull support and additional push support starting with small circumferential forces, or pull support with small circumferential forces and additional push support starting from increased circumferential forces). Cost-effective machining of radially disposed stop faces 29, 30, 31, 32 of the housing 2 provides that a single tool (milling cutter or broaching profile) is so configured and dimensioned, and the tool is so guided through the extension 26, 27 of the housing 2, that two opposite stop faces 29, 31; 30, 32 can be machined simultaneously with one feed movement of the tool.

In principle it is entirely possible that the circumferential forces are transmitted by the back plate 11 directly to the relevant application points x1, x2 of the housing bridge 5. However, for various reasons it may be advantageous to effect this force transmission indirectly by interposing a reinforcement 28, a comparatively thin sheet of stainless, high-alloy steel sheet material, for example, being placed on the support surface. A possibility is thereby created of influencing the contact-force and frictional conditions between back plate 11 (steel sheet material) and housing bridge 5 of the fixed caliper (cast material such as, in particular, gray cast iron or cast steel, or cast light alloy material), and avoiding immediately direct contact of the partners. Furthermore, corrosion behavior or sensitivity to contamination can be influenced favorably. An especially favorable configuration is produced if the housing 2 of the fixed caliper is originally formed—that is, cast—in a sand casting process or in a gravity diecasting process, and if the bores 8, 9 are formed in the housing limbs 3, 4 by machining, a tool being introduced between the housing limbs 3, 4, into the intervening space which receives the brake pads 6, 7 and the brake disk when the fixed caliper is fully assembled. In this connection it is also advantageous if all the bores 8, 9 are arranged in alignment with and precisely opposite one another in the housing limbs 3, 4, and if the defined distance between the housing limbs 3, 4 is formed at least slightly larger than the length of a piston 13, 14, so that both the machining of the bores 8, 9 and the assembly of the pistons 13, 14 is carried out via the intervening space. This configuration makes it possible to dispense with a multi-part, screwed configuration of the fixed caliper. In the hydraulically actuated variants of a fixed caliper brake 1, further machining steps may consist in providing additional hydraulic connecting bores 33 or connections 34. This concerns, in particular, one or more air bleed holes for one or more hydraulic pressure chambers 35, and the provision of one or more connecting bores 33 between different hydraulic pressure chambers 35. Whenever a housing limb 3, 4 has a plurality of bores 8, 9, such connecting bores between hydraulic pressure chambers 35 are necessary.

A further essential measure in the fixed caliper brakes 1 consists in providing at least one hydraulic connection 36 between opposite hydraulic pressure chambers 35 in the opposite housing limbs. This hydraulic connection 36 may run internally, that is, starting from a pressure chamber 35 in a housing limb 3, 4, or starting from a connecting bore 33 between pressure chambers 35 in this housing limb 3, 4, through the housing bridge 5 to a hydraulic pressure chamber 33a in the opposite housing limb 3, 4, or to a connecting bore 33a between pressure chambers 33a, 33b in this housing limb, so that the hydraulic conduit is completely integrated. If, however, a direct point-to-point connection is not feasible because of a geometrical shape of the fixed caliper brake 1, it may be expedient and necessary to build up the connecting bores segmentally from a plurality of bore sections, the bore sections being aligned at an angle to one another. Because, in producing the bore sections concerned, at least undesired tool entry openings and possibly also undesired tool exit openings remain in the housing, these openings may be provided with a closing means after production and cleaning of the bores, and/or surface treatment. In the preferred case the closing means are in the form of balls, the diameter of which is slightly greater than the diameter of the bore, so that a hydraulically sealed closure of the tool entry and exit openings is produced by pressing in the balls. It may also be provided, alternatively or additionally to pressing-in, that the closing means, in particular balls, are caulked with the housing material, a plurality of force application points distributed regularly around the circumference being, for example, provided and being visible on the product through pressure marks.

Alternatively to a completely integrated conduit, an externally attached, conventional pipe connection between the housing limbs 3, 4, requiring reduced machining outlay, may be provided. Mixed forms are possible, the pressure chambers 35 in one housing limb 3, 4 being connected by internal connecting bores, for example, and the two housing limbs 3, 4 being supplied through an attached pipe connection.

Although electromechanical wheel brakes use in principle an entirely different active energy, the electrical energy supply by means of electrical lines is effected in principle analogously to the hydraulic active energy supply as described above.

As was explained, a brake pad 6, 7 engages on the housing bridge of the fixed caliper brake 1 from the radially inner side, so that corresponding guidance and captive retention in the radially outward direction is present. In the radially inward direction a brake disk hat (wheel hub) inherent in the design usually prevents the brake pads 6, 7 from falling out, so that constructional, positively acting, captive retention is thereby provided, preventing the pads from falling out. Replacement of the brake pads 6, 7 is effected by removing the brake caliper from the stub axle and removing the brake pads 6, 7 from the housing 2 after the spring element 21 has been removed.

According to the different embodiments of the invention, the spring arrangement is designed in each case such that the brake pads 6, 7 are pulled or pushed in a permanently elastic manner radially outwards into the guide. The at least one, elastically pretensioned spring element 21 is provided between piston 13, 14 and/or housing 2 and brake pads 6, 7, and loads at least one or both brake pads 6, 7 radially outwards in the direction of the housing bridge 5.

In this connection a plurality of alternative individual variants of a spring arrangement are possible in principle:

a) spring element(s) 21 fastened in an integrated manner to the back plate 11 of one or both brake pads 6, 7—for example by engagement in a cup-shaped piston 13, 14;

b) spring element(s) 21 for both brake pads 6, 7 fastened in an integrated manner to the housing 2.

In the embodiments integrated in the brake pad (type a)), a structure which consists in providing the back plate 11 with at least one spring arm 39 for engaging in a cup-shaped piston 13, 14 is suitable, the spring action being directed radially outwards.

In another preferred solution (type b)), a spring element 21 is arranged on the radially inner side of the housing 2 in the region of a brake disk hat, and presses the brake pads 6, 7 radially outwards into their guide. The spring element 21 may be, in particular, fastenable releasably. Purely by way of example, spring element 21 is screw-fastened to housing 2.

A spring element 21 may be produced from steel wire or shaped from flat steel sheet substantially without machining and may have a corresponding sheet metal design with axially oriented, rib-shaped reinforcement 52. To fasten the spring element 21, a screwed or latched arrangement on the housing 2 is suitable, whereby at least one locking section 37 of spring element 21 slides on an associated guide 39, for example, and can therefore engage automatically, by means of an axially directed insertion movement, form-fittingly into or behind at least one recess or undercut 38 of the housing 2, so that axially directed assembly of the spring element 21 is possible. Assembly is carried out by inserting the brake pads 6, 7 into the housing 2 and then inserting the spring element 21 parallel to the axial direction ax through an opening 40 of the back plate 11 before the housing 2 is installed on the motor vehicle.

The housing 2 includes at least one opening, preferably an integrated assembly snap-fitting or latching fastening for form-fittingly receiving a locking section 37 of spring element 21. Adjacently to an integrated guide 39, the locking section 37 snaps in an elastic, form-fitting manner into an undercut 38 of the housing 2 after reversible elastic deformation. The spring element 21 is thereby arranged in a fixed manner on the housing 2.

The spring element 21 may assume additional functions, in particular by means of a component according to FIG. 17 together with the following features. Since the spring element 21 is configured as a carrier for fastening a retaining element 46, it may additionally be used to support at least one other component. For example, the retaining element 46 may have projections 50, 51 which fix one or more conductors 47, 48 of brake lining wear warning devices BBW (warning contacts) elastically to the housing 2 in such a way that these conductors 47, 48 are arranged, for example in the region of a visible front or bridge surface of the housing 2, in an optically attractive and cost-effective manner on the housing 2 and are secured against wear, damage, etc. In addition, through the simple measure according to the invention, unintended pulling-out of any plug connection present can be reliably prevented. Separate outlay for a known tubular component as in EP 602 866 B1 is not required. According to the invention the beam-shaped spring element 21, disposed parallel to the axial direction ax, has multiple functions. Furthermore, separate fastening means between retaining element 46 and housing 2 are not required. The invention is therefore, in particular, advantageously suited to solutions in which at least one separate warning contact for monitoring the wear state of a friction compound 10 is placed on each wheel brake, on each side of a brake disk in each case. At least one elastic latching device 49 may be provided between spring element 21 and retaining element 46, which latching device 49 advantageously has a plurality of arms serving to fasten the retaining element 46 in a releasable manner. The fastening is preferably released in such a way that the retaining element 46 engages in an opening of the spring element 21.

Figure 3:
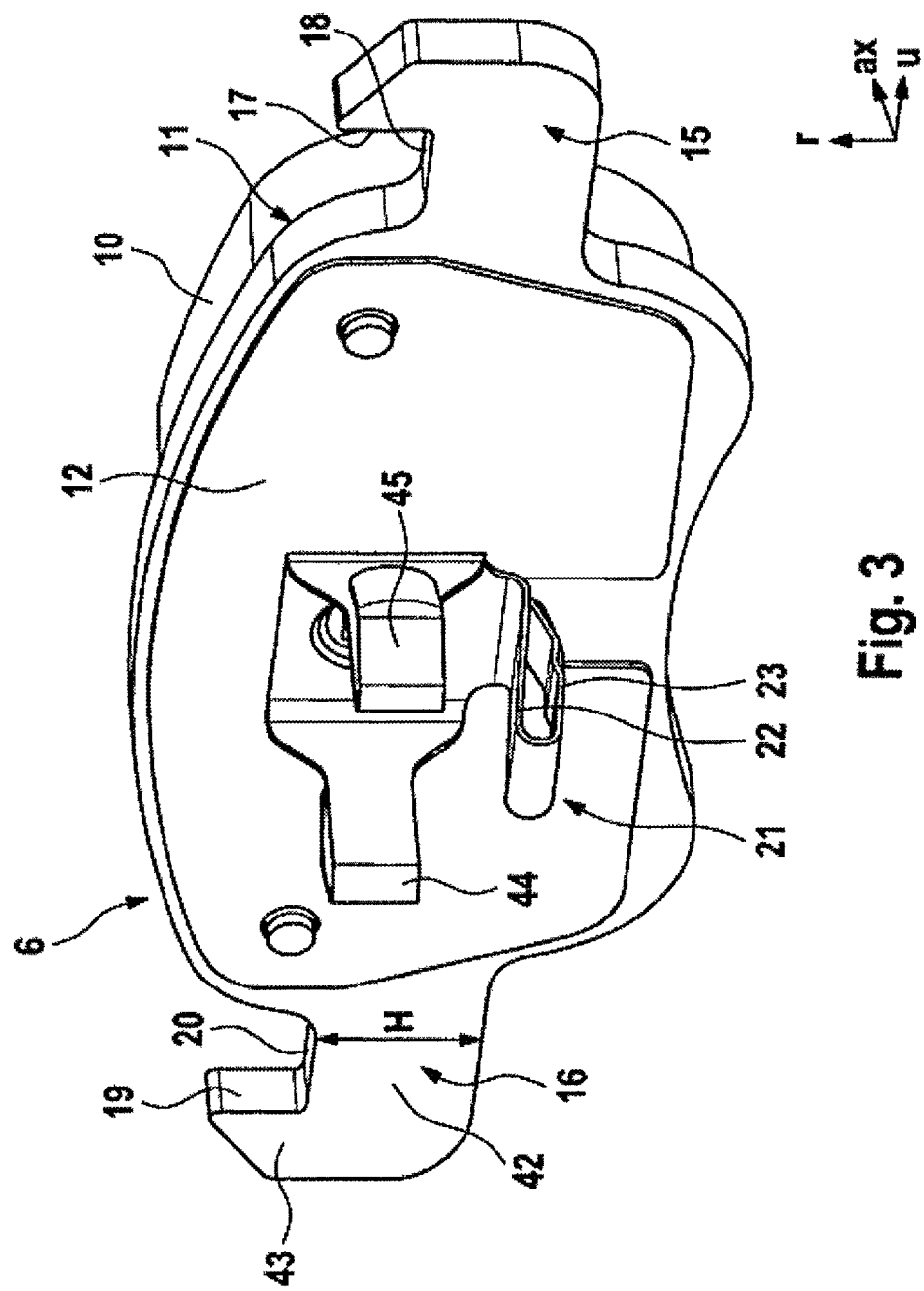
FIG. 3 is a back plate perspective view of a brake pad for the fixed caliper.
Figure 6:
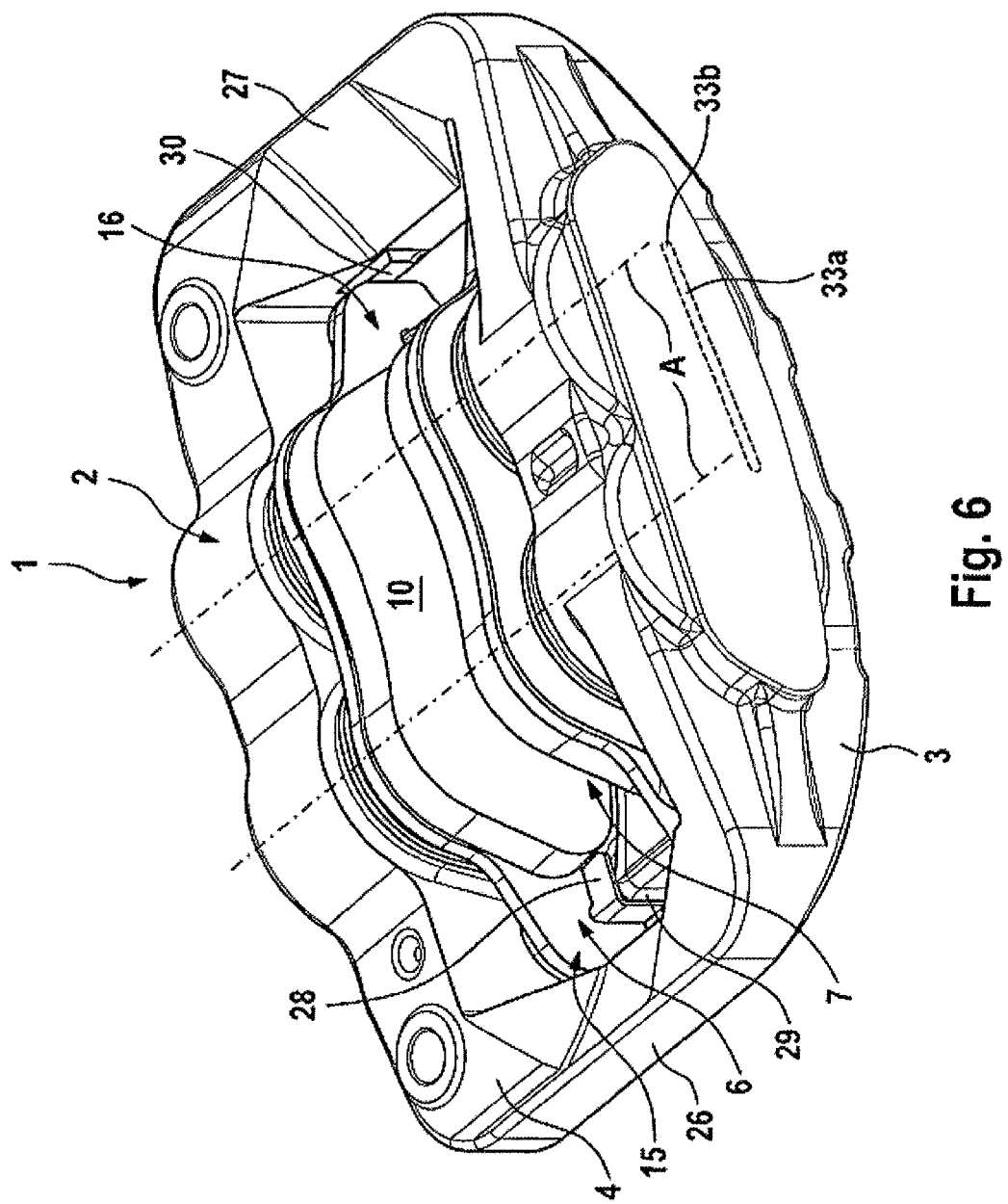
FIG. 6 shows the brake caliper housing as shown in FIG. 2 in perspective view from below.
Figure 7:
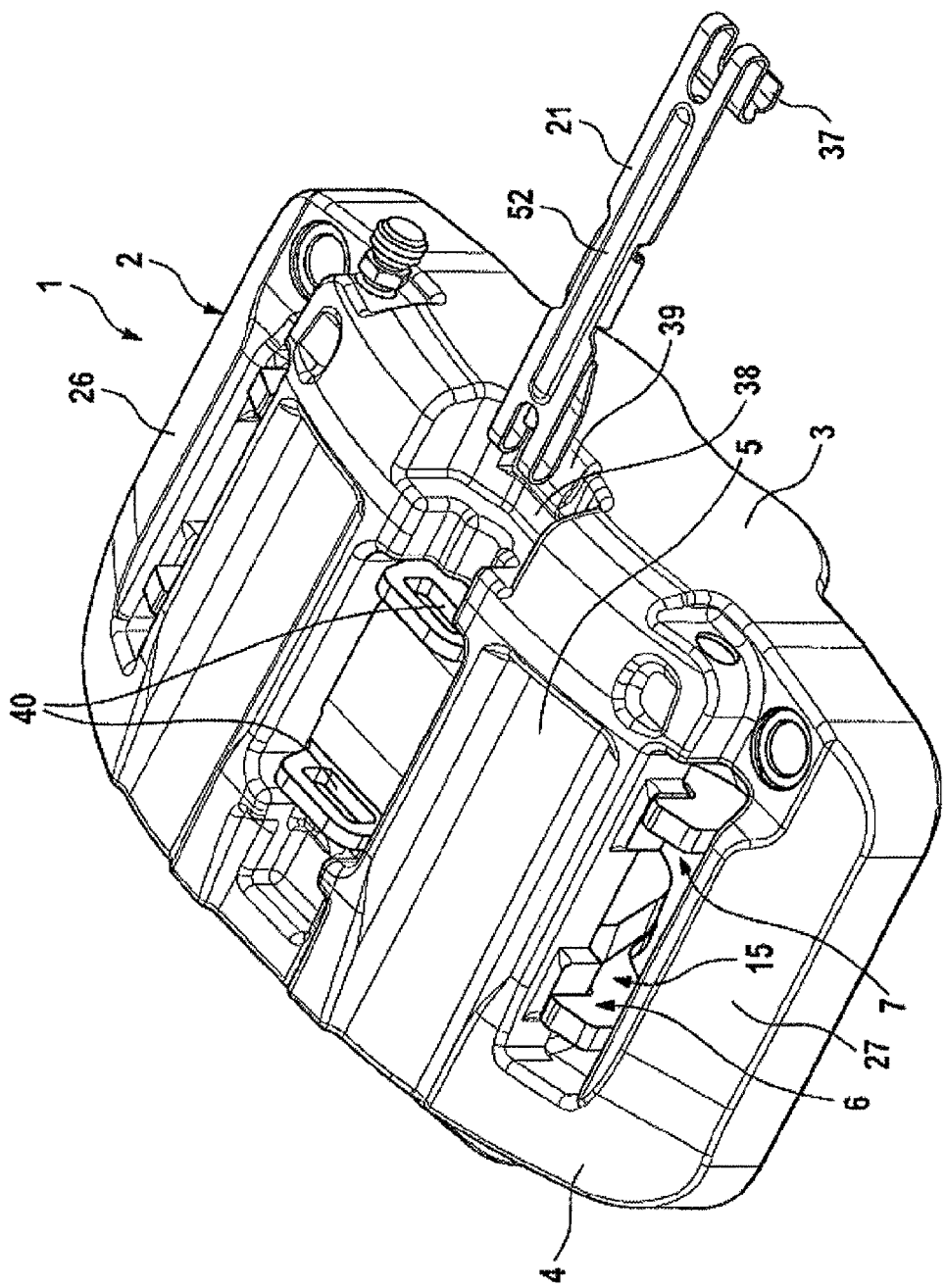
FIG. 7 is a perspective top view of the brake caliper in FIG. 6 including a pulled out top spring.
Figure 8:
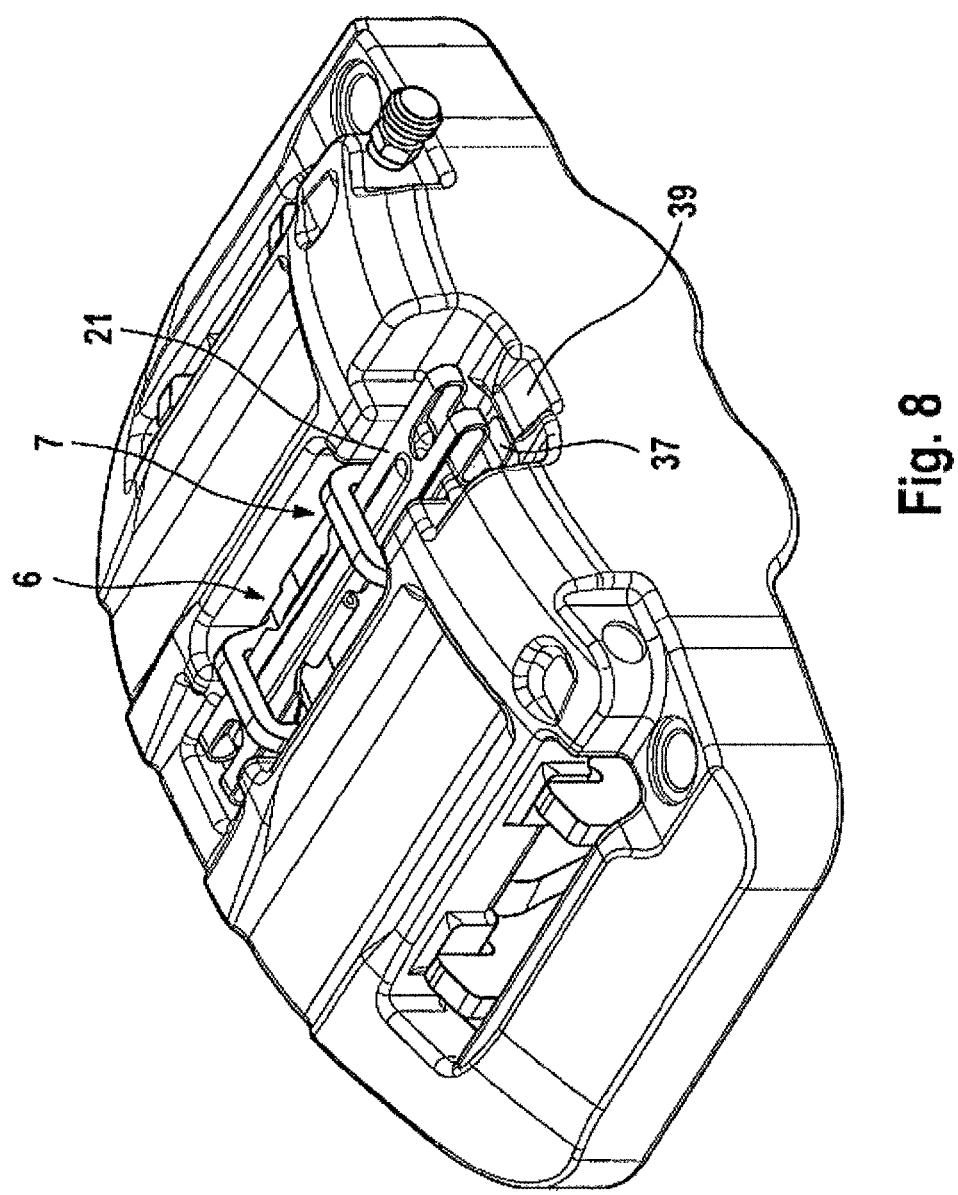
FIG. 8 shows a brake caliper including spring installation in a perspective top view as shown in FIG. 7.
Figure 9:
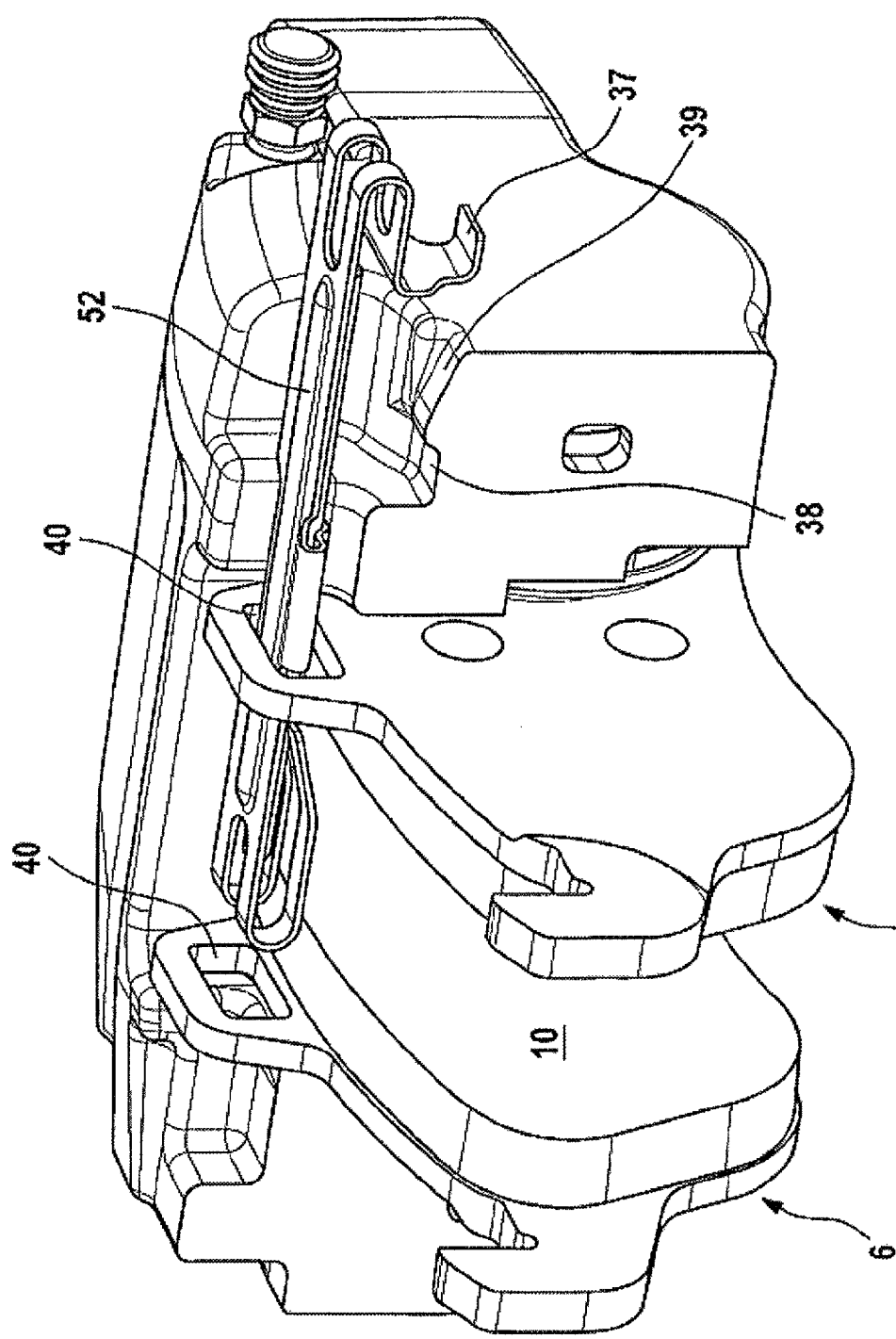
FIG. 9 is a sectional perspective view of details in FIG. 8.
Figure 10:
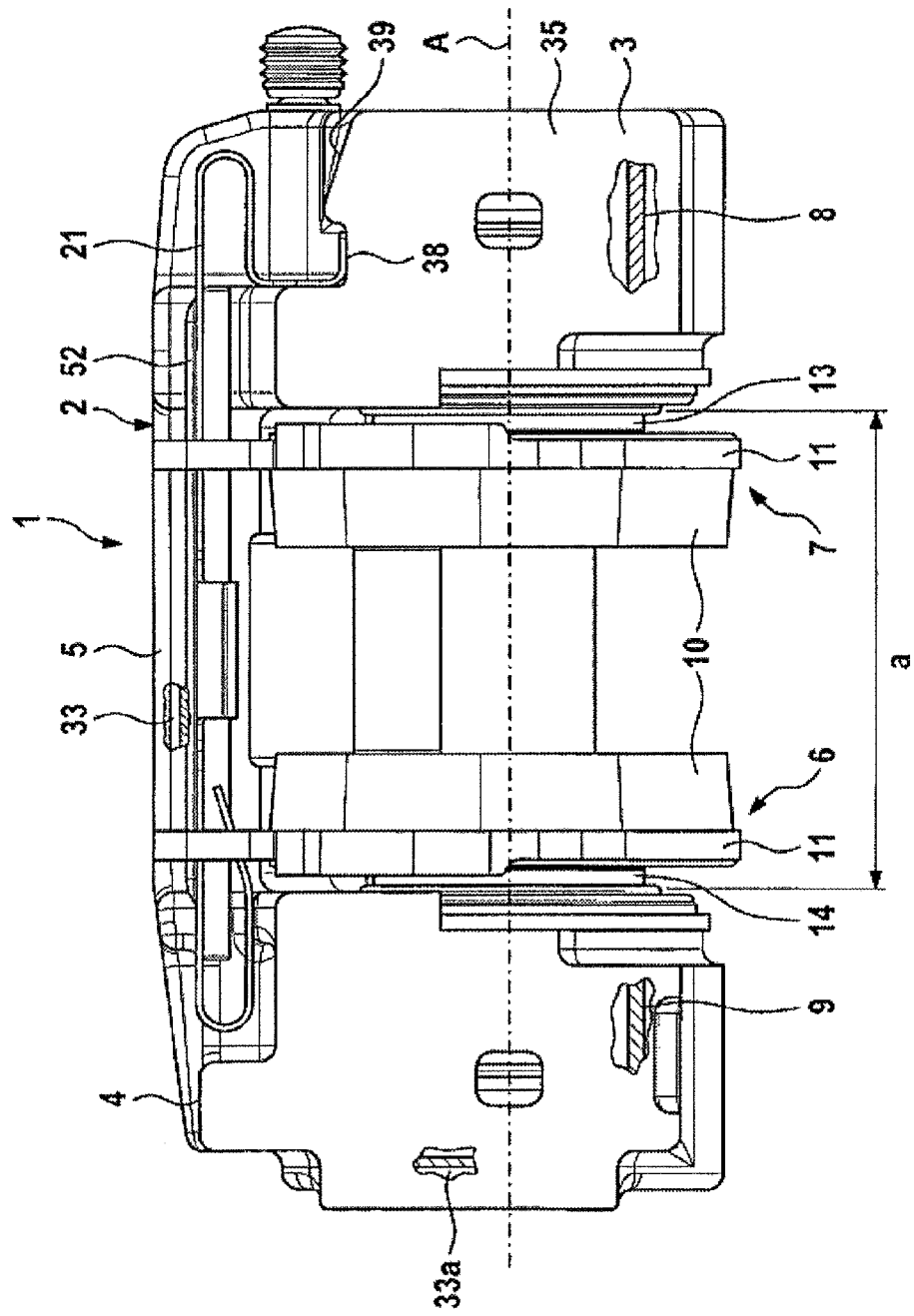
FIG. 10 is a sectional view from the side of the caliper as shown in FIG. 9.
Figure 11:
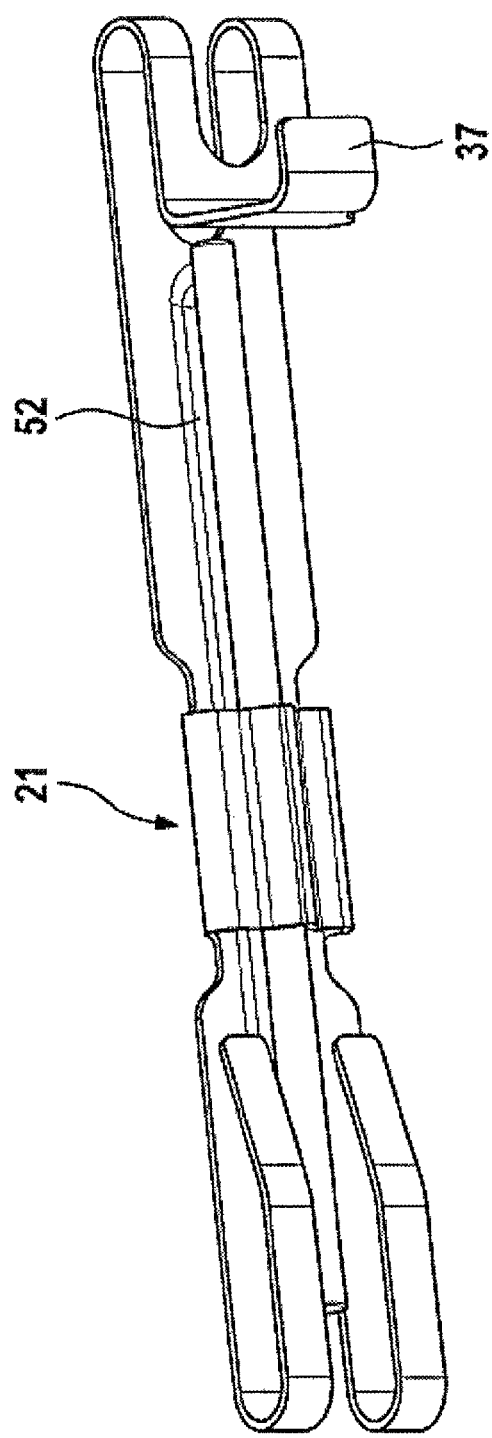
FIG. 11 is a perspective bottom view from of a spring as shown in FIG. 10.
Figure 12:
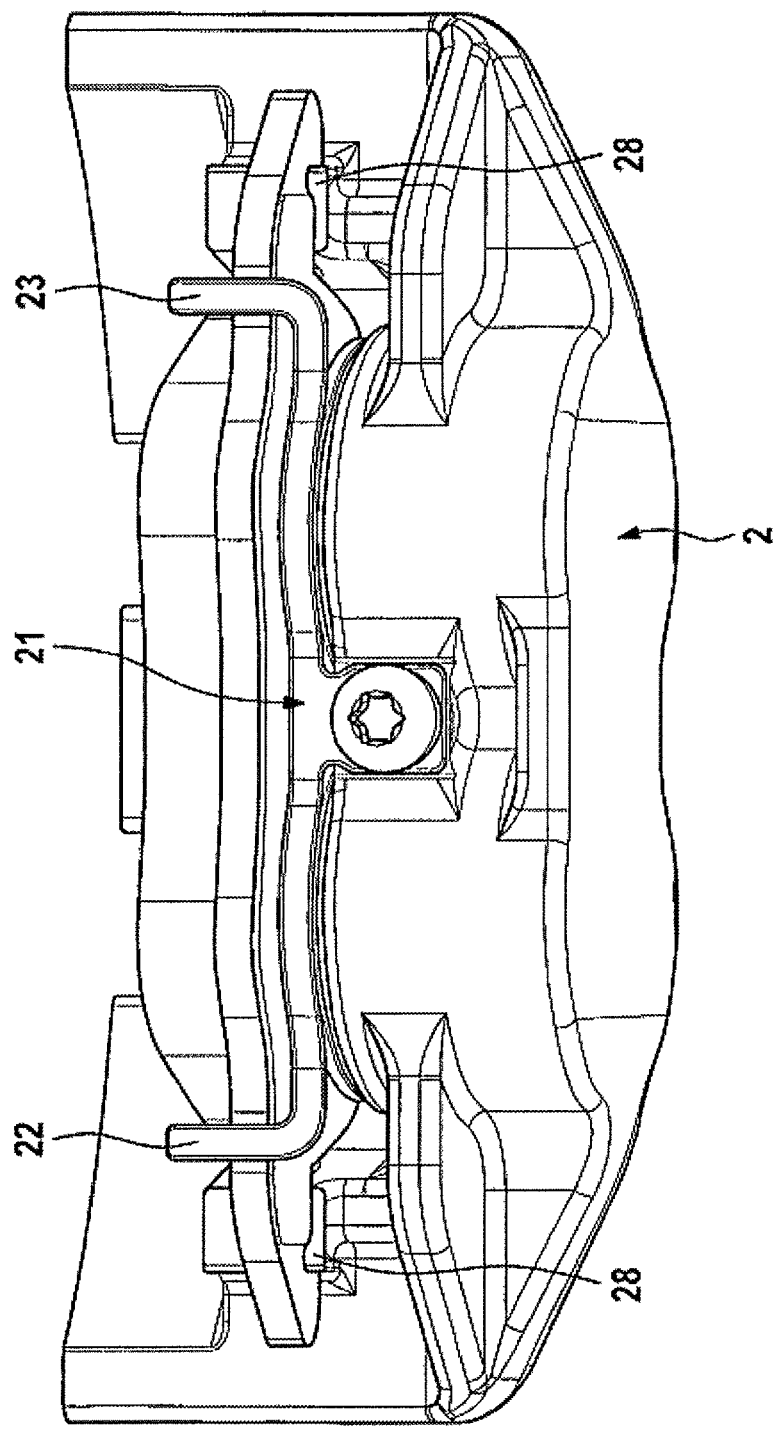
FIG. 12 shows a brake caliper embodiment in bottom view comprising a changed spring embodiment.
Figure 13:
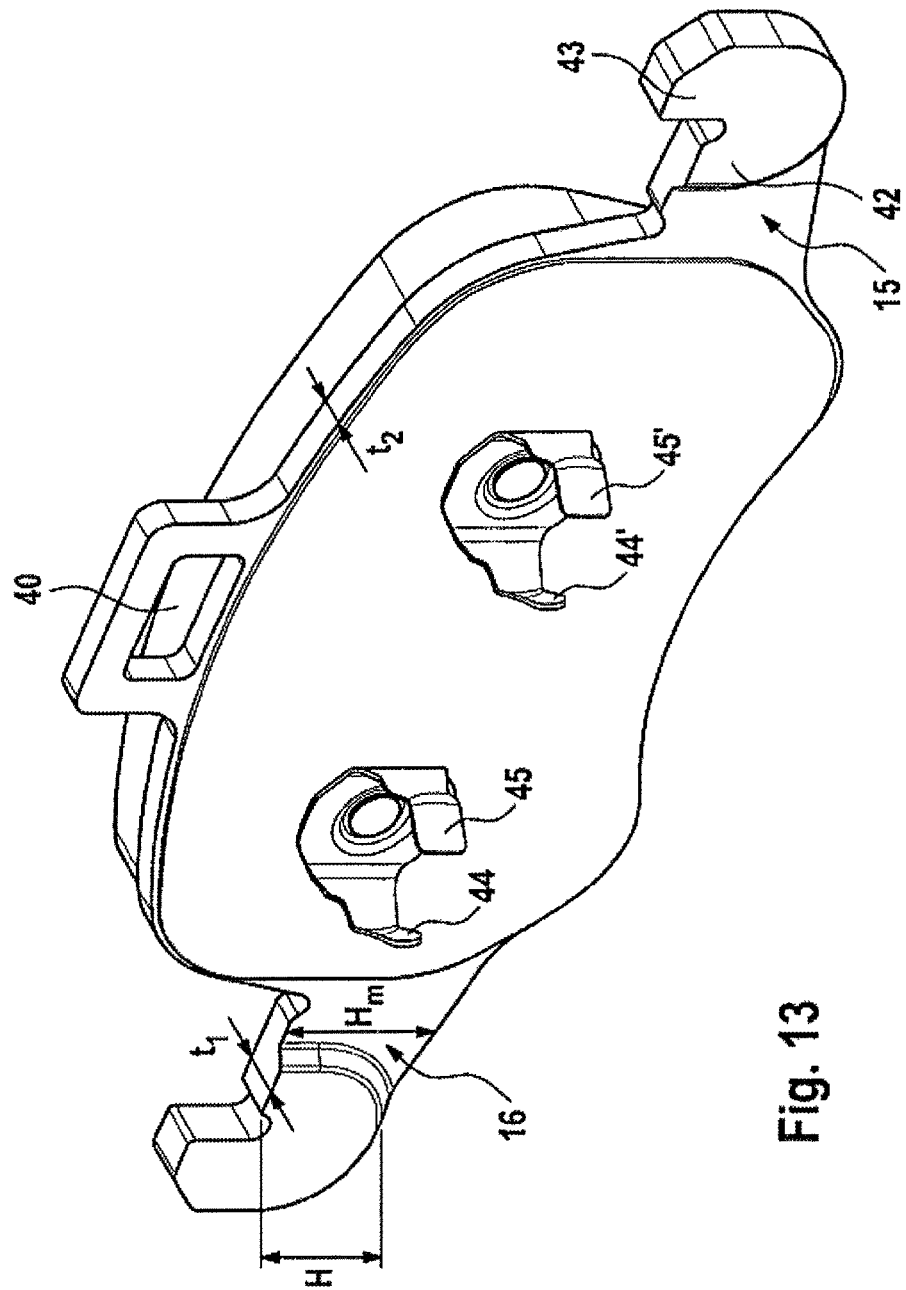
FIG. 13 shows a brake pad embodiment in perspective view as in FIG. 3.
Figure 14:
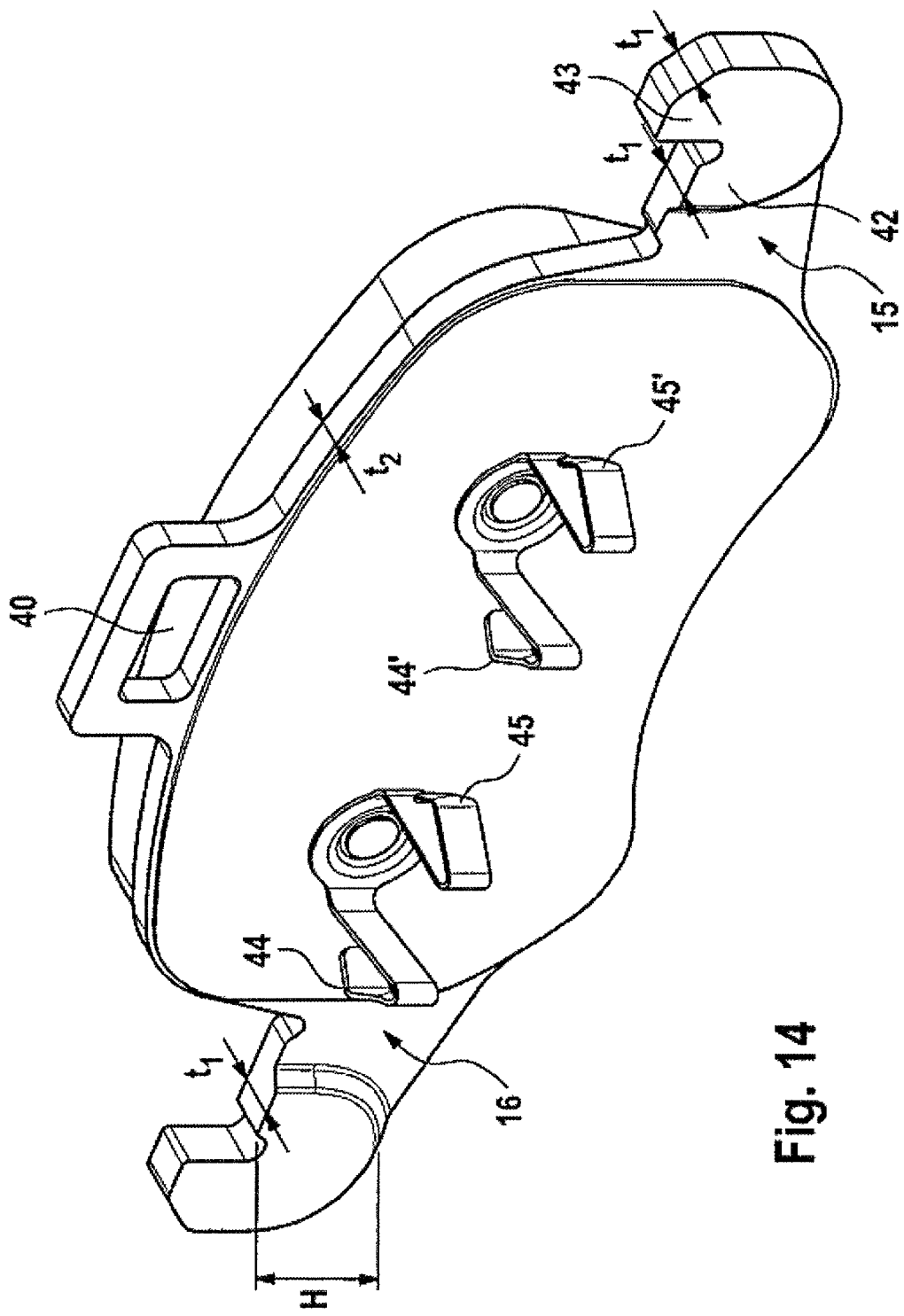
FIG. 14 is another embodiment of a brake pad in view as shown in FIG. 13.
Figure 15:
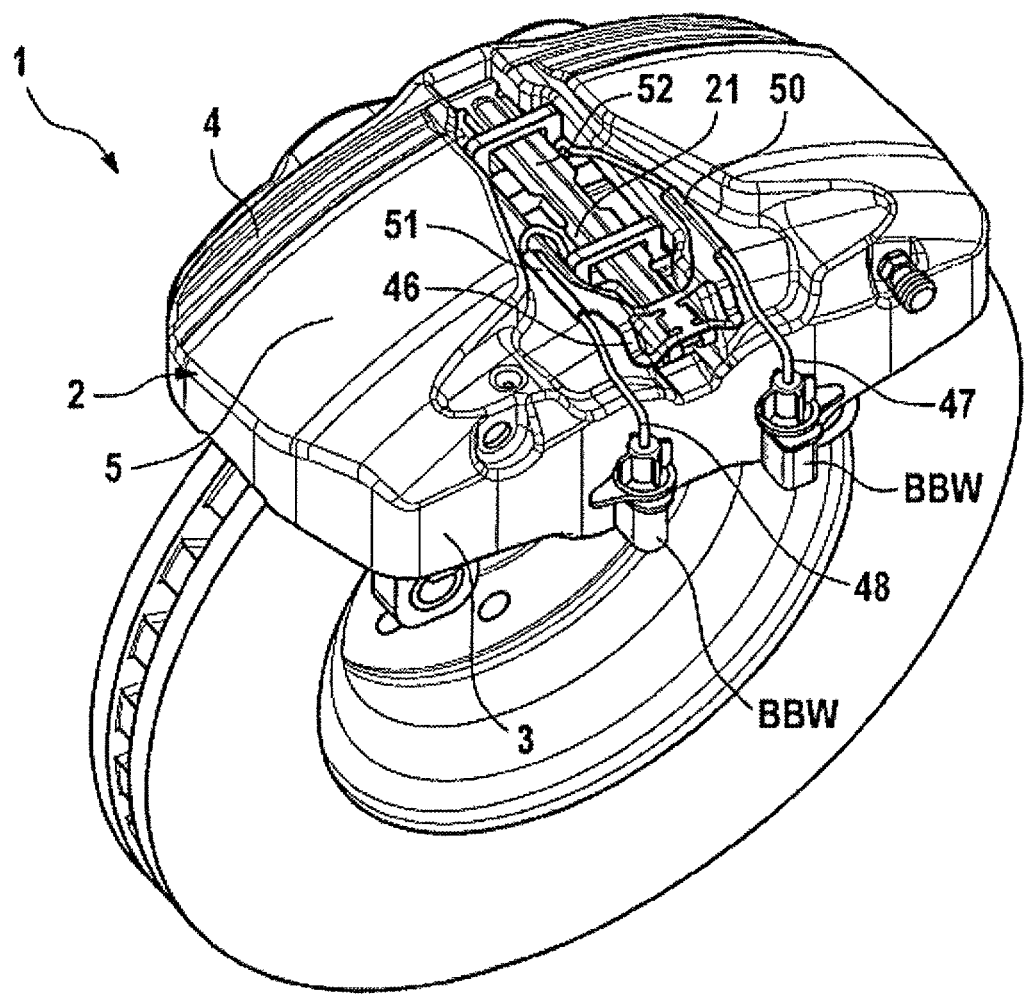
FIG. 15 is a perspective top view of a disk with caliper.

The brake pads 6, 7, as shown in FIGS. 3, 4, 5, 13, 14, may be provided with all the aforementioned features in combination, or with the following features separately in each case. At least one of the arm sections 42, 43 of the back plate 11 may have a thickness t1 which is greater than a thickness t2 of the central section 12 of the back plate 11. Because the positioning of the thickened portion t1 increases a tensile stress-carrying cross section substantially over the entire height H thereof in the region of the predominant tensile stresses, an improved transfer of tensile stress to the arm sections 42, 43 with a reduced stress concentration is made possible. According to the invention, the problem of providing an additional material volume for producing the thickened portion in the free stressed cross section of the arm sections 42, 43 is solved by at least one cold-forming process on the back plate 11. The system thereby differs sufficiently from the basic concept of a known hammer-head shaped back plate for a floating caliper, which essentially has only partial thickening in the region of an abutment surface, according to EP 1 217 247 B1, the free end having a thickened configuration substantially at its edge in the region of an abutment of the bracing element (holder), in order primarily to form an enlarged abutment surface for the bracing element, so that surface pressure in the region of this abutment is reduced.

For all embodiments of the housing 2 of the fixed caliper brake 1 it is in principle the case that a fastening between stub axle (not shown) and housing 2 can be effected, with reciprocal adaptation of the interface, by means of radially oriented fastening means (screws) or by means of axially oriented fastening means (screws) or by a mixed form of these variants, the fastening means passing through correspondingly oriented fastening holes in the housing 2. However, for application or adaptation to different vehicle installation situations it is in principle possible to provide an interface kit such that the housing 2 has in principle only fastening holes for the radially oriented fastening means, and that a separate attachment part 41 (adapter) is associated with such a "standard" housing in order to permit low-cost adaptation to vehicles having an axially oriented fastening interface, or conversely. Additional costs for producing a plurality of housing casting molds in an optically acceptable manner are saved by the attachment part 41, and standardization is enhanced. This yields advantages in relation to rationalization of mechanical production.

LIST OF REFERENCES

1 Fixed caliper brake
2 Housing
3,4 Housing limb
5 Housing bridge
6,7 Brake pad
8,9 Bore
10 Friction compound
11 Back plate
12 Central section
13,14 Piston
15,16 Arm
17-20 Abutment face
21 Spring element
22,23 Spring arm
24,25 Abutment face
26,27 Extension
28 Reinforcement
29-32 Stop face
33 Connecting bore
34 Connection
35 Pressure chamber
36 Connection
37 Locking section
38 Undercut
39 Guide
40 Opening
41 Attachment part
42,43 Arm section
44,45 Spring arm
46 Retaining element
47 Conductor
48 Conductor
49 Latching device
50 Projection
51 Projection
52 Reinforcement
a Distance
A Axis
H Height/Hm Mean height
ax Axial direction
u Circumferential direction
r Radial direction
t1,t2 Thickness
x,x1,x2 Point of application
Y Area centroid
BBW Brake lining wear warning device (Warning contact)

The invention claimed is:

1. A fixed caliper brake for a motor vehicle, comprising a housing with two housing limbs and a housing bridge connecting the housing limbs in a flexurally rigid manner at a defined distance from one another, the housing fastened detachably to a stub axle of the motor vehicle, pistons which are received in bores in the housing limbs and are guided displaceably along an axis A in relation to a brake disk such that each housing limb includes at least one of the pistons, and brake pads which are provided in pairs, are guided in an axially displaceable manner in the housing and are arranged in a circumferential direction while being supported against circumferential forces, each brake pad being positioned to be directly actuated by a respective one of the pistons, wherein the housing bridge includes a portion positioned directly radially outward of the brake pads which blocks removal of the brake pads through an opening in the housing bridge, the portion including housing bridge abutment surfaces, the brake pads include a backplate and arms disposed substantially opposite one another, each arm having a first arm portion extending in a first direction relative to the brake pad and a second arm portion extending from the first arm portion in the radially outward direction, the radially outward direction different from the first direction, each arm portion having a brake pad abutment surface facing respective ones of the housing bridge abutment surfaces, the brake pad abutment surfaces directly or indirectly abutting the respective ones of the housing bridge abutment surfaces.

2. The fixed caliper brake for a motor vehicle as claimed in claim 1, wherein the housing bridge abutment surface is provided on a run-in side of the housing bridge.

3. The fixed caliper brake for a motor vehicle as claimed in claim 1, wherein the brake pads are supported directly, or indirectly via a reinforcement, on the housing bridge.

4. The fixed caliper brake for a motor vehicle as claimed in claim 1, wherein the housing is formed by casting in one piece from a light alloy.

5. The fixed caliper brake for a motor vehicle as claimed in claim 1, wherein the housing has a pressure medium inlet, an air bleed bore and integrated hydraulic passages formed by casting or machining, between hydraulic pressure chambers for the pistons.

6. The fixed caliper brake for a motor vehicle as claimed in claim 1, wherein the housing limbs have the bores arranged in each case in alignment with and opposite one another, with the defined distance between the housing limbs being formed at least slightly larger than the length of one of the pistons.

7. The fixed caliper brake for a motor vehicle as claimed in claim 1, wherein the housing bridge is formed without an opening for removing the brake pads.

8. The fixed caliper brake for a motor vehicle as claimed in claim 1, wherein at least one elastically preloaded spring element is provided between the pistons and/or the housing and the brake pads, which spring element urges at least one of the brake pads radially outwards in the direction of the housing bridge.

9. The fixed caliper brake for a motor vehicle as claimed in claim 8, wherein the spring element is arranged on a radially inner side of the housing in the region of a brake disk hat.

10. The fixed caliper brake for a motor vehicle as claimed in claim 8, wherein the spring element is arranged on the housing substantially in the region of the housing bridge.

11. The fixed caliper brake for a motor vehicle as claimed in claim 8, wherein the spring element is configured substantially as a spring arranged parallel to the axis A for elastically preloading the brake pads, and in that the housing has at least one opening for receiving the spring element in a form-fitting manner.

12. The fixed caliper brake for a motor vehicle as claimed in claim 11, wherein the spring element has an integrated reinforcement which is arranged parallel to the axis A.

13. The fixed caliper brake for a motor vehicle as claimed in claim 11, wherein an integrated assembly and retaining device is provided for the spring element.

14. The fixed caliper brake for a motor vehicle as claimed in claim 13, wherein the spring element has a locking section, and in that the locking section engages elastically in an undercut of the housing.

15. The fixed caliper brake for a motor vehicle as claimed in claim 14, wherein a guide on the housing is associated with the locking section, and in that the locking section is initially deformed elastically in an insertion process of spring element directed parallel to the axis A, the length of the guide being configured such that the locking section automatically snaps into the undercut under an elastic spring effect at the end of an insertion process.

16. The fixed caliper brake as claimed in claim 8, wherein the spring element is provided as a carrier for fastening a retaining element which fixes at least one electrical conductor.

17. The fixed caliper brake as claimed in claim 16, wherein at least one elastic latching device is provided between spring element and retaining element.

18. The fixed caliper brake as claimed in claim 16, wherein the at least one electrical conductor comprises a plurality of conductors, and the retaining element has a plurality of elastic projections for fixing the plurality of conductors.

19. The fixed caliper brake as claimed in claim 1, wherein an attachment part is provided between a stub axle permanently attached to the motor vehicle and the housing.

20. The fixed caliper brake for a motor vehicle as claimed in claim 1, wherein the first and second arm portions are arranged substantially at right angles to one another and adjoining one another.

21. The fixed caliper brake for a motor vehicle as claimed in claim 1, wherein the backplate has at least one spring arm.

22. The fixed caliper brake for a motor vehicle as claimed in claim 1, wherein a central section of the backplate has a section, facing radially outwards, with an opening for receiving a spring element, or for receiving a spring arm.

23. The fixed caliper brake for a motor vehicle as claimed in claim 1, wherein a thickness (t1) is provided for stress reduction largely, and substantially completely, over a height (H) of the arm section.

* * * * *